(12) United States Patent
Straub

(10) Patent No.: US 12,428,160 B2
(45) Date of Patent: Sep. 30, 2025

(54) TRAVEL PRIVACY AND PROTECTIVE CURTAIN

(71) Applicant: Michael Straub, Pacific Grove, CA (US)

(72) Inventor: Michael Straub, Pacific Grove, CA (US)

( * ) Notice: Subject to any disclaimer, the term of this patent is extended or adjusted under 35 U.S.C. 154(b) by 0 days.

(21) Appl. No.: 18/611,668

(22) Filed: Mar. 20, 2024

(65) Prior Publication Data

US 2024/0375777 A1 Nov. 14, 2024

Related U.S. Application Data

(63) Continuation-in-part of application No. 15/930,163, filed on May 12, 2020, now abandoned.

(51) Int. Cl.
*B64D 11/06* (2006.01)

(52) U.S. Cl.
CPC ................ *B64D 11/0606* (2014.12)

(58) Field of Classification Search
CPC .. B64D 11/0604; B64D 11/0606; A47H 1/18; A47H 2201/01; A47H 2201/02; B60J 11/00; B60J 11/06; B60J 11/08; B60J 1/2091
USPC ............ 160/13, 16, 370.21, 368.1, 351
See application file for complete search history.

(56) References Cited

U.S. PATENT DOCUMENTS

| | | | | |
|---|---|---|---|---|
| 3,834,756 A | * | 9/1974 | Grell | B62B 5/0013 296/77.1 |
| 10,800,532 B2 | * | 10/2020 | Hall, Jr. | B60N 2/90 |
| 2009/0056887 A1 | * | 3/2009 | Britt | B60J 11/00 160/368.1 |
| 2022/0363395 A1 | * | 11/2022 | Katz | B64D 11/0606 |

OTHER PUBLICATIONS

"Olive Suction Cup Magnetic Mount," Sep. 6, 2017, Oliv Mounts (Year: 2017).*
"Strong Magnetic Clips Heavy Duty," Mar. 22, 2018, accessed May 27, 2022 (Year: 2018).*
"Oliv Magnetic Suction Cup Mount," Jan. 14, 2019, Oliv, accessed May 27, 2022 (Year: 2019).*

* cited by examiner

*Primary Examiner* — Joshua J Michener
*Assistant Examiner* — Ryan Andrew Yankey
(74) *Attorney, Agent, or Firm* — The Rapacke Law Group, P.A.

(57) ABSTRACT

A personal privacy and protective curtain is disclosed, comprising a portable curtain having a material to at least partially cover an opening provided in a vehicle's cabin. The personal privacy and protective curtain to at least partially block a passenger from view and provide a protective sanitary barrier during travel. At least one attachment mechanism releasably engages with a surface of at least one fixture within the vehicle cabin to interface with a corresponding attachment mechanism provided on the portable curtain.

20 Claims, 9 Drawing Sheets

TRAVEL PRIVACY AND PROTECTIVE CURTAIN

CROSS-REFERENCE TO RELATED APPLICATIONS

The present application claims priority to and is a Continuation-In-Part Application of U.S. Non-Provisional application Ser. No. 15/930,163 filed May 12, 2020, titled "TRAVEL PRIVACY & PROTECTIVE CURTAIN," which is hereby incorporated by reference in its entirety.

TECHNICAL FIELD

The embodiments generally relate to privacy and protective curtains and, more specifically, relate to privacy and protective curtains that are releasably engaged with cabin fixtures of an aircraft.

BACKGROUND

Designers of vehicle interiors (e.g., motor vehicles, aircraft, trains, and boats) aim to make a comfortable cabin space which adheres to safety standards. For example, in commercial air travel, cabins are often divided into several parts. These can include travel class sections in medium and large aircraft. Seats are arranged in rows and alleys and may contain passenger entertainment systems or modular chairs to allow the passenger to recline or extend a leg rest for increased comfort.

Travel classes may be divided by curtains to provide the feeling of privacy between business class, first class, and economy class. Depending on the size of the vehicle, it may contain a number of full-flat seats which allow the passenger to lay down during transport. Often, the full-flat seats are provided in a first-class section, or in sections for frequent travelers who have accrued a large amount of travel points, miles, or the like through the travel provider.

On long voyages, many passengers sleep to pass the time or simply to rest during their travel. This experience may be uncomfortable for some as attendants and passengers may pass in a close proximity to the sleeping passenger. While some methods of transportation provide enclosed cabins with doors, window, or the like that shield the passenger from other passengers, most vehicles and methods of transportation do not incorporate such barriers between passengers, and where private cabins are available, as on some trains or planes, fares are typically considerably higher than that for a traditional seat.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

Embodiments described herein provide a personal privacy and protective curtain, comprising a privacy and protective curtain having a material to at least partially cover an opening provided in a vehicle's cabin. The personal privacy and protective curtain is configured to at least partially block a passenger from view and provide a protective sanitary barrier from other passengers during travel. At least one attachment mechanism releasably engages with a surface of at least one fixture within the vehicle cabin to interface with a corresponding attachment mechanism provided on the personal privacy and protective curtain. A top cover is connected to the curtain to provide at least partial blockage of the view of the overhead space above the passenger's head. The top cover may be connected to a window cover portion which covers a window within the aircraft.

The window cover portion may allow for the user to select the amount of light which enters the interior space within the personal privacy and protective curtain. Utilizing the window cover portion to cover the window may allow for the user to eliminate or at least substantially reduce light within the interior of the personal privacy and protective curtain. On the other hand, the user may remove or raise the window cover portion to allow light to enter. This may be especially useful if the passenger wants privacy from the perspective of the cabin, while still wanting light to enter the interior of the personal privacy and protective curtain (e.g., when reading).

The personal privacy and protective curtain system may be configured in various configurations to completely block the seating space from view, or only covering the head and torso of the passenger. This may be especially useful if the passenger wants a portion of their body covered, while leaving the seating space open to the cabin. In some cases, leaving the seating space open to the cabin may be required by aircraft policy. In other cases, leaving a portion of the seating area exposed to view from the cabin allows for aircraft personnel to serve food and beverages, and otherwise service the area.

The embodiments provide a portable privacy and protective curtain which releasably engages with the fixtures within a vehicle cabin to provide the feeling of security, privacy, and shade from light. The privacy and protective curtain is constructed of a textile which at least partially blocks light while providing a barrier between the passenger and the cabin space such as the alley, adjacent seats, and the like. The device is easily deployable in various cabin shapes and configuration to allow the user to readily deploy and store the device as needed.

In one aspect, the attachment mechanism comprises a first magnet at least partially embedded within a receiver.

In one aspect, a second magnet is attached to a surface of the personal privacy and protective curtain, wherein the second magnet releasably engages with the first magnet.

In one aspect, the attachment mechanism comprises at least one suction cup to releasably engage with the surface.

In one aspect, the suction cup comprises the first magnet at least partially embedded within a receiver.

In one aspect, the attachment mechanism comprises a clip releasably engaged with the surface, wherein the clip retains the personal privacy and protective curtain in a suitable position to at least partially block the passenger from view or provide a protective sanitary barrier.

In one aspect, the clip comprises a first magnet at least partially embedded therein, wherein the magnet releasably engages with a second magnet provided on the personal privacy and protective curtain.

In one aspect, a plurality of magnets are provided within a cavity of the personal privacy and protective curtain.

In one aspect, the plurality of magnets are sewn into the personal privacy and protective curtain to retain the plurality of magnets in a suitable position therein.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
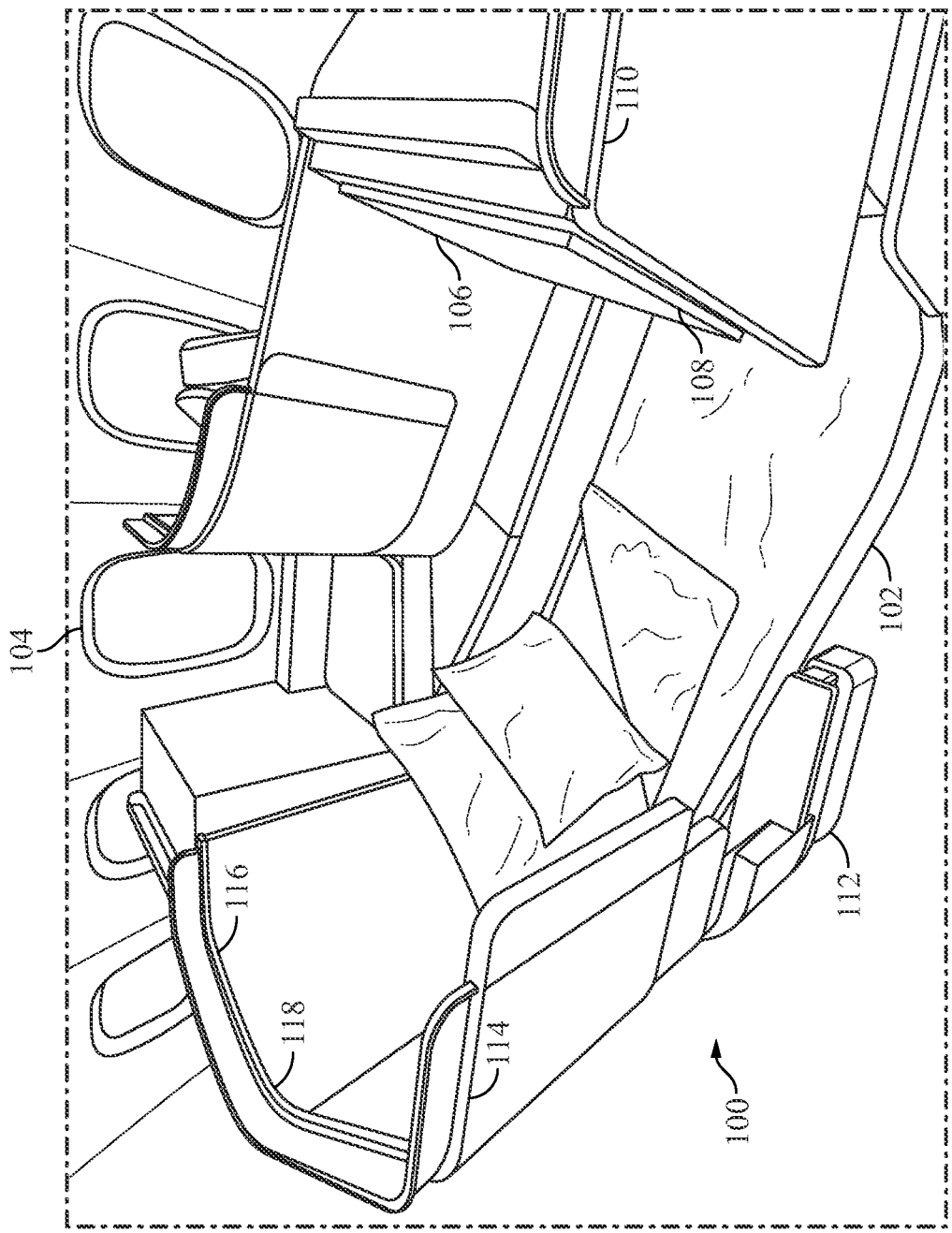
FIG. 1 illustrates a perspective view of a vehicle cabin and fixtures thereof, according to some embodiments.

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

As used herein, the term "vehicle" may be used to the described motor or engine driven vehicles, cars, busses, trains, aircraft, boats, or other vehicles known in the arts for transporting goods or persons, in addition to similar non-vehicular confined spaces, such as office cubicles, wherein a user may desire additional privacy or protective removable barriers. One skilled in the arts will readily understand that the present system may be utilized with a variety of vehicle types and configurations wherein a user may desire further privacy or protective barriers between themselves and other passengers or areas of the vehicle.

In general, the embodiments provided herein relate to a portable privacy and protective curtain which releasably engages with the fixtures within a vehicle cabin. The privacy and protective curtain is constructed of a textile which at least partially blocks light while providing a barrier between the passenger and the cabin space such as the alley, adjacent seats, and the like. The privacy and protective curtain may further be utilized to provide a protective sanitary barrier between the user and other passengers within the vehicle cabin.

FIG. 1 illustrates a vehicle cabin 100, such as an aircraft cabin, having a seat 102 whereon the passenger sits or lies down during the duration of travel. Often, a window 104 is provided to allow the passenger to view the exterior environment and to provide light during travel. An entertainment system 106 is provided in front of the passenger to allow the passenger to interact with the vehicle's entertainment system. The entertainment system 106 may be provided on the back side 108 of the forward seat 110 positioned in front of the passenger. An armrest 112 is provided which may comprise a folding tray or the like to rest objects or to rest the arms of the passenger during travel. In some embodiments, a sidewall 114 extends from the seatback 116 extending along the headrest 118. Each feature of the vehicle cabin, seat, entertainment system, and sidewalls of the fuselage may be referred to herein as "fixtures" which may provide a means for attaching a personal privacy and protective curtain described herein.

Figure 2:
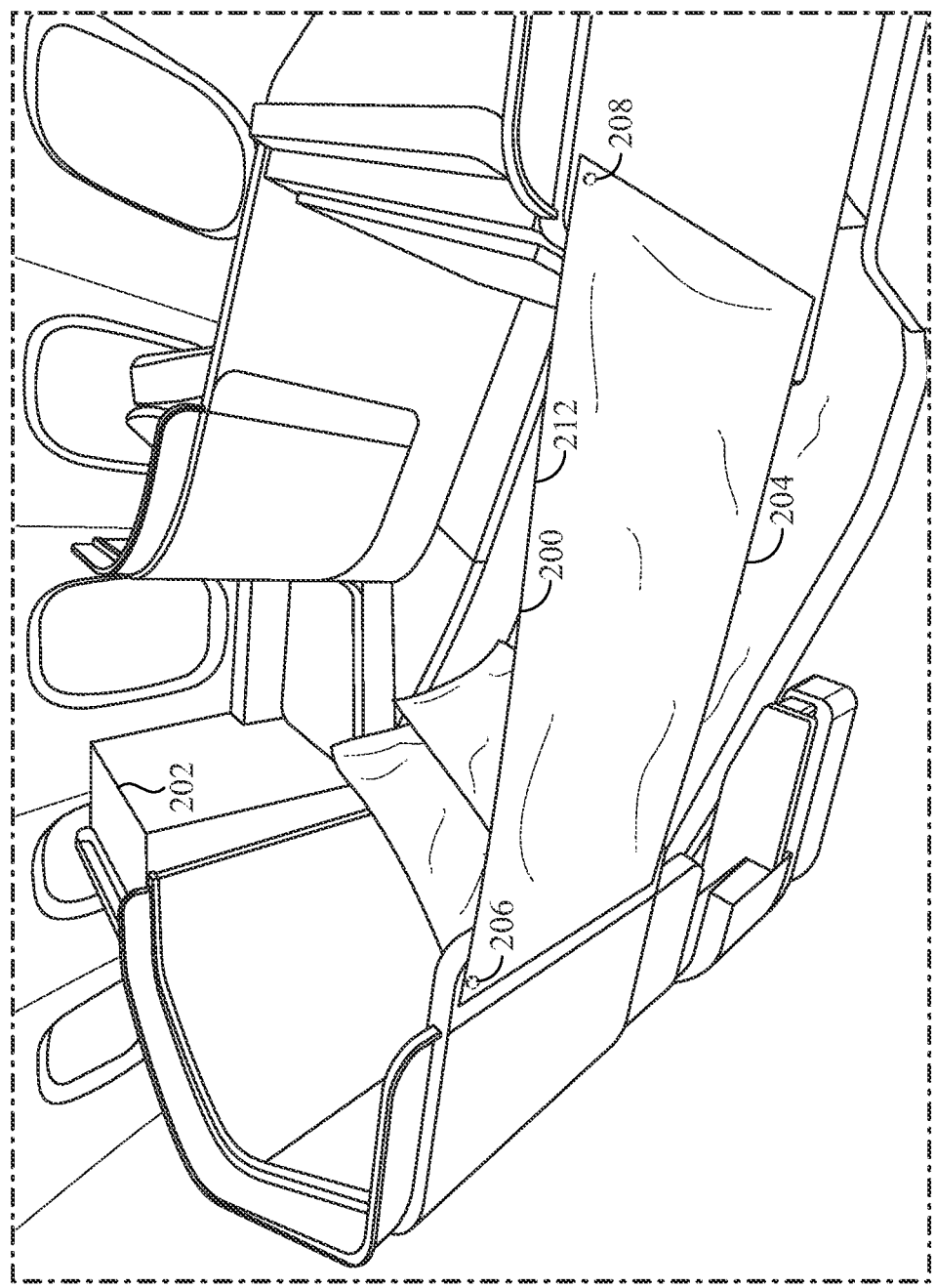
FIG. 2 illustrates a perspective view of the personal privacy and protective curtain releasably engaged with one or more fixtures within a vehicle cabin, according to some embodiments.

FIG. 2 illustrates the personal privacy and protective curtain 200 releasably engaged with one or more vehicle cabin fixtures 202 within the vehicle cabin space. The personal privacy and protective curtain 200 is dimensioned to extend across the opening 204 defined by the edge of the sidewall 114 and the edge of the back side 108 of the forward seat in front of the passenger. One or more attachment mechanisms 206, 208 are provided to releasably engage with the vehicle cabin fixtures 202. The attachment mechanisms may be interchangeable to allow the personal privacy and protective curtain 200 to selectively interface with various surfaces provided on the fixtures including metals, plastics, windows, textiles, and the like. FIG. 2 specifically shows the personal privacy and protective curtain 200 extending across the entryway to the seat to at least partially block the view of the passenger from the side or provide a protective sanitary barrier between the passenger and other passengers within the vehicle cabin space. The attachment mechanisms 206, 208 are provided on the top portion 212 of the personal privacy and protective curtain 200 to allow the material to extend and hang downward to at least partially block the passenger from view or provide a protective sanitary barrier.

As used herein, the term "attachment mechanism" refers to any means for attaching two or more components such as magnets, hook-and-loop systems, clips, retainers, adhesives, static cling devices, static adhesives, and the like. The attachment mechanism may be at least partially embedded or affixed to a material, such as the material used to construct the personal privacy and protective curtain 200. The attachment mechanism may be provided as a combination of attachment mechanisms, such as those shown in FIG. 5 and FIG. 6 wherein the attachment mechanism comprises a suction cup (shown in FIG. 5) or a clip (shown in FIG. 6), each having an at least partially embedded magnet therein.

In some embodiments, one or more magnets are provided within or on the surface of the personal privacy and protective curtain 200 material. The magnets may be provided in various locations along the perimeter or at the corners of the personal privacy and protective curtain 200. The magnets allow for the personal privacy and protective curtain 200 length, shape, and configuration to be adjusted to fit various dimensions. In some embodiments, the personal privacy and protective curtain 200 may fold onto itself using the magnets to retain the personal privacy and protective curtain 200 in a folded configuration.

In some embodiments, the magnets may be loose within an interior cavity defined by the sidewalls of the personal privacy and protective curtain 200.

In some embodiments, a hook-and-loop system is sewn onto the surface of the personal privacy and protective curtain 200 to interface with a corresponding hook-and-loop system provided on a surface of the attachment mechanism attached to a fixture within the vehicle cabin. For example, a plurality of hook-and-loop systems are provided along the perimeter of the personal privacy and protective curtain 200 to interface with corresponding hook-and-loop systems positioned on the attachment mechanisms.

In some embodiments, the attachment mechanism comprises a rope or string extending through an opening between the first and second sides of the personal privacy and protective curtain 200. The ends of the rope or string may releasably engage with the attachment mechanisms affixed to the fixtures within the vehicle cabin.

One skilled in the arts will readily understand that the personal privacy and protective curtain 200 may be configured either for use with a specific vehicle type or such that it may be universally deployable across several vehicle types such that in some embodiments the personal privacy and protective curtain 200 may be employed within a vehicle cabin 100 of several vehicle types (e.g., motor or engine driven vehicles, cars, busses, trains, aircraft, boats, or other vehicles known in the arts for transporting goods or persons) interchangeably. In some embodiments, the personal privacy and protective curtain 200 may be deployed in non-vehicle settings, such as an office cubicle wherein the user desires further privacy or protectable barrier.

Figure 3:
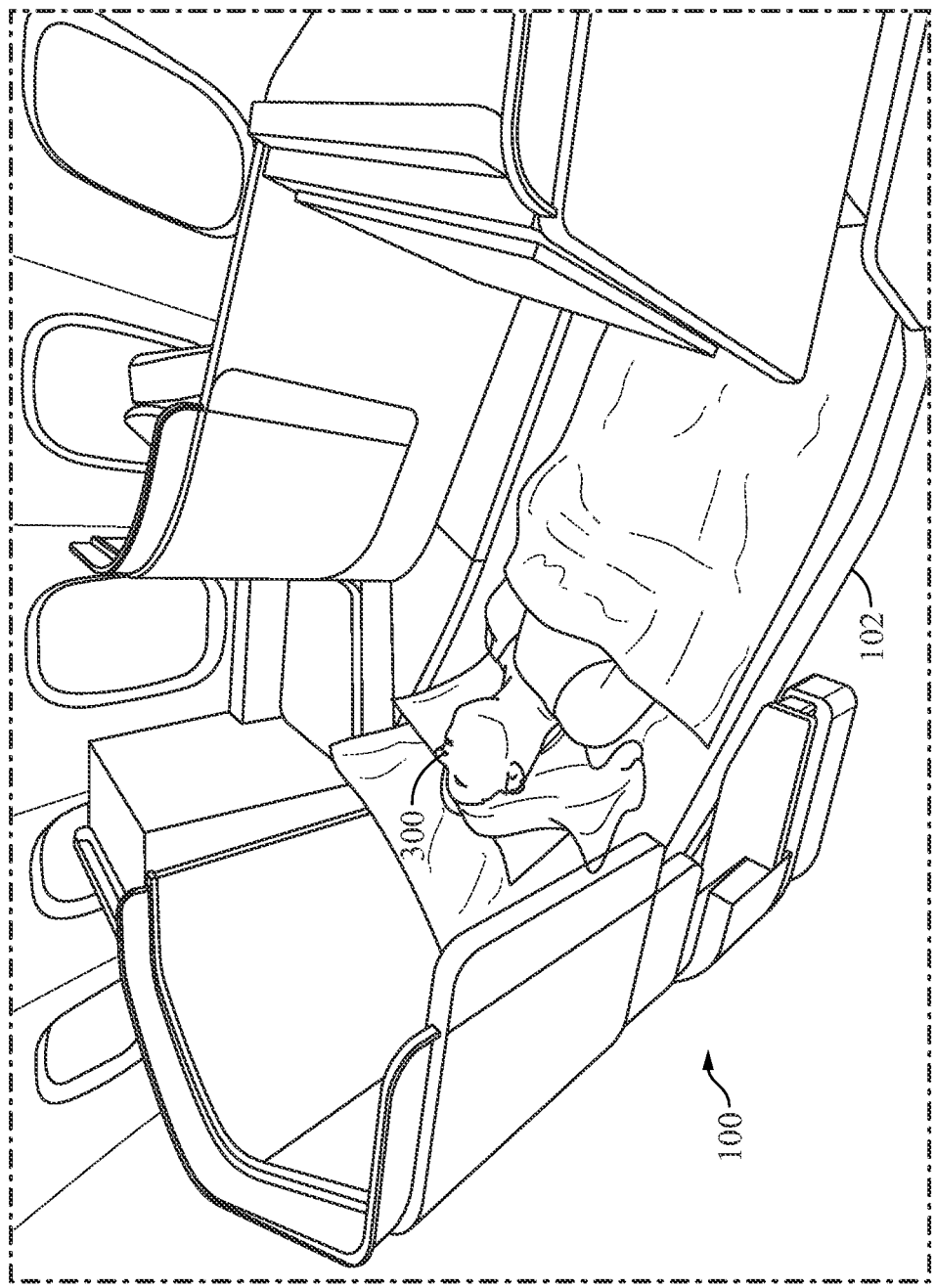
FIG. 3 illustrates a perspective view of the passenger seated in the vehicle seat, according to some embodiments illustrates a perspective view of the personal privacy and protective curtain releasably engaged with one or more fixtures within a vehicle cabin, according to some embodiments.

FIG. 3 illustrates the passenger 300 resting on the seat 102 within the vehicle cabin 100. The personal privacy and protective curtain 200 is provided to at least partially cover the passenger, to block the passenger from view from one or more sides, or provide a protective sanitary barrier. The passenger may adjust the orientation of the privacy and protective curtain 200 to suit their liking during travel such that the personal privacy and protective curtain 200 at least partially cover the side and entryway of the seat.

Figure 4:
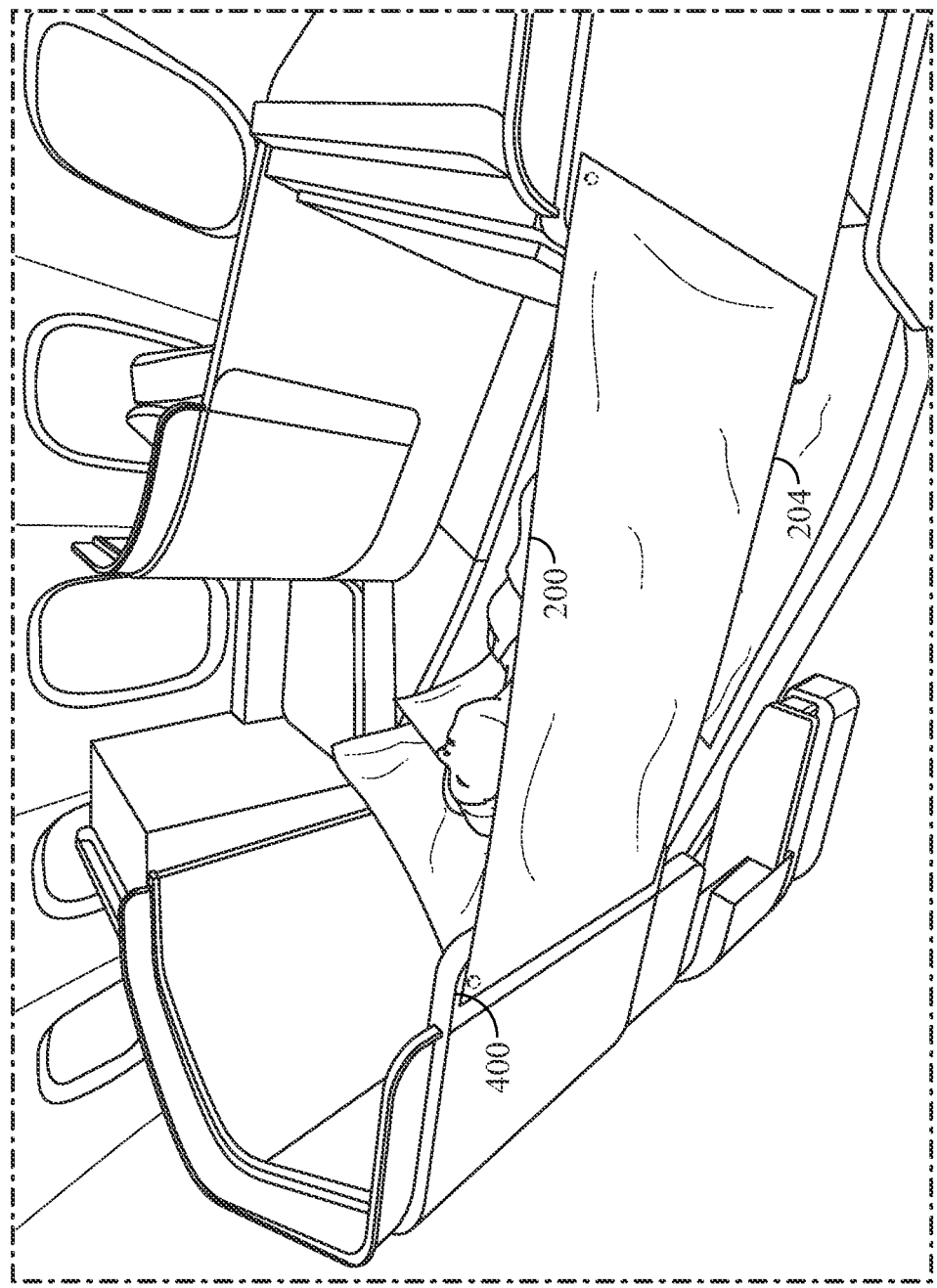
FIG. 4 illustrates a perspective view of the personal privacy and protective curtain releasably engaged with one or more fixtures within a vehicle cabin, according to some embodiments.

FIG. 4 illustrates the personal privacy and protective curtain 200 extending over the top 400 of the opening 204 to at least partially cover the passenger from the top and/or the sides during travel. The passenger may selectively adjust the orientation of the personal privacy and protective curtain 200 throughout the duration of travel to suit their liking using the releasably engageable attachment mechanisms described herein. One skilled in the art will readily understand that the personal privacy and protective curtain 200 may be configured to extend from the top 400 to extend toward the window of the vehicle cabin to shield the passenger from above.

Figure 5:
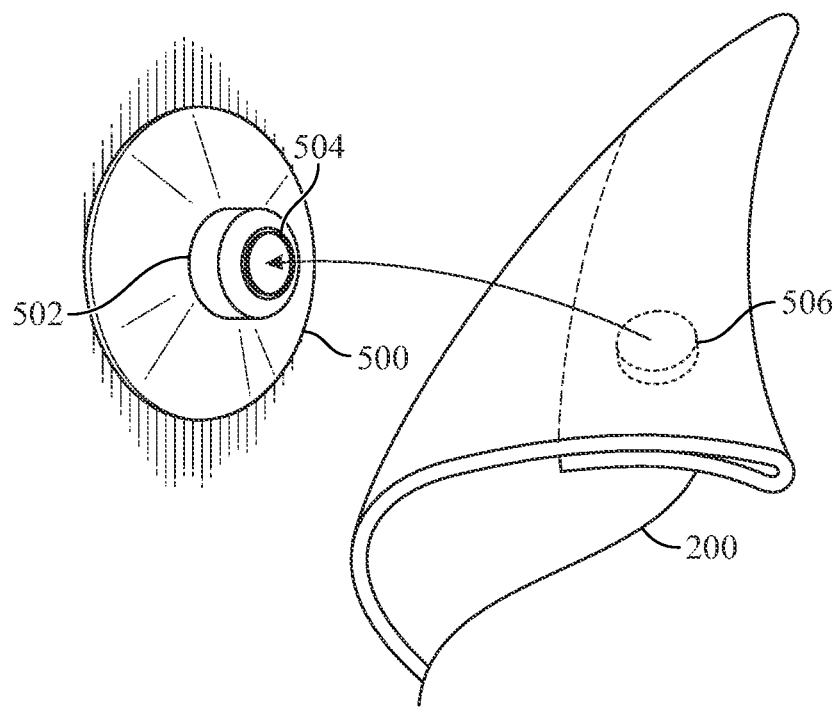
FIG. 5 illustrates a perspective view of the attachment mechanism releasably engaged with the personal privacy and protective curtain, according to some embodiments.

FIG. 5 illustrates an exemplary attachment mechanism comprising a suction cup 500 having a receiver 502 to receive a magnet 504 or magnetic component to releasably engage with a second magnet 506 or magnetic component provided on the surface of or within the fabric of the personal privacy and protective curtain 200. During use, the suction cup 500 is applied to a surface within the vehicle cabin. The surface may include a window or surface of the seat and components thereof which may provide an anchor for the suction cup. The magnet 504 may be at least partially embedded into the suction cup 500 to provide a smooth interface between the first and second magnets 504, 506.

In some embodiments, an adhesive is provided on a surface of the attachment mechanism to releasably engage with the surface of one or more fixtures provided within the vehicle cabin.

Figure 6:
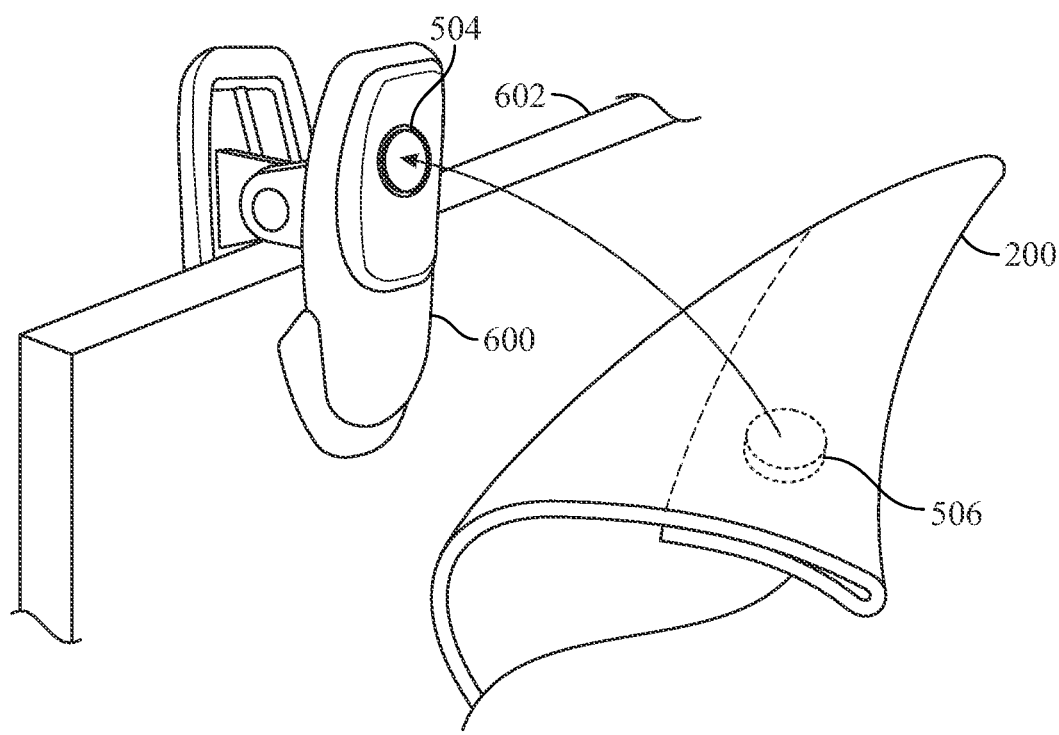
FIG. 6 illustrates a perspective view of the attachment mechanism releasably engaged with the personal privacy and protective curtain, according to some embodiments.

FIG. 6 illustrates an exemplary attachment mechanism comprising a clip 600 to releasably engage with an edge 602 of a fixture within the vehicle cabin. The clip 600 may comprise a magnet 504 or magnetic component to releasably engage with a second magnet provide on the surface of or within the fabric of the personal privacy and protective curtain 200. During use, the clip 600 is first retained on the edge 602 at a suitable distance from a second clip to extend the personal privacy and protective curtain 200 and at least partially block the passenger from view or provide a protective sanitary barrier. The magnet 504 may be at least partially embedded into the suction cup 500 to provide a smooth interface between the first and second magnets 504, 506.

In some embodiments, the personal privacy and protective curtain 200 may be folded over an edge of one or more fixtures 202 to allow the clip 600 to retain the personal privacy and protective curtain 200 thereon. The clip 600 forms a friction fit with the material of the personal privacy and protective curtain 200 to retain the personal privacy and protective curtain 200 in a suitable position to at least partially block the passenger from view from various directions or provide a protective sanitary barrier.

Figure 7:
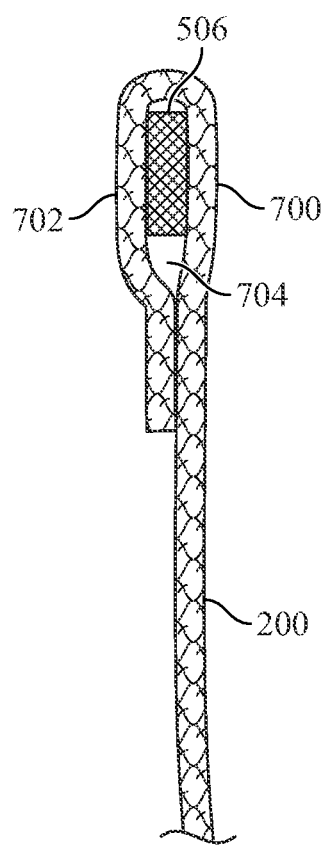
FIG. 7 illustrates a cross-section of the personal privacy and protective curtain and magnets disposed therein, according to some embodiments.

FIG. 7 illustrates a cross-section of the personal privacy and protective curtain 200 comprising a first side 700 and a second side 702 having at least one magnet 506 disposed therebetween. The magnet may be sewn into the cavity 704 between the first and second sides 700, 702 to retain the magnet in a suitable position during use such that the magnet may releasably engage with the attachment mechanism selected by the user.

In some embodiments, the personal privacy and protective curtain 200 may comprise one or more apertures to receive a loop to permit the personal privacy and protective curtain 200 to be hung over at least one fixture 202 within the vehicle cabin. The loop may be formed by a rope, string, or the like having hook-and-loop components on each end to allow the user to selectively form the loop.

Figure 8:
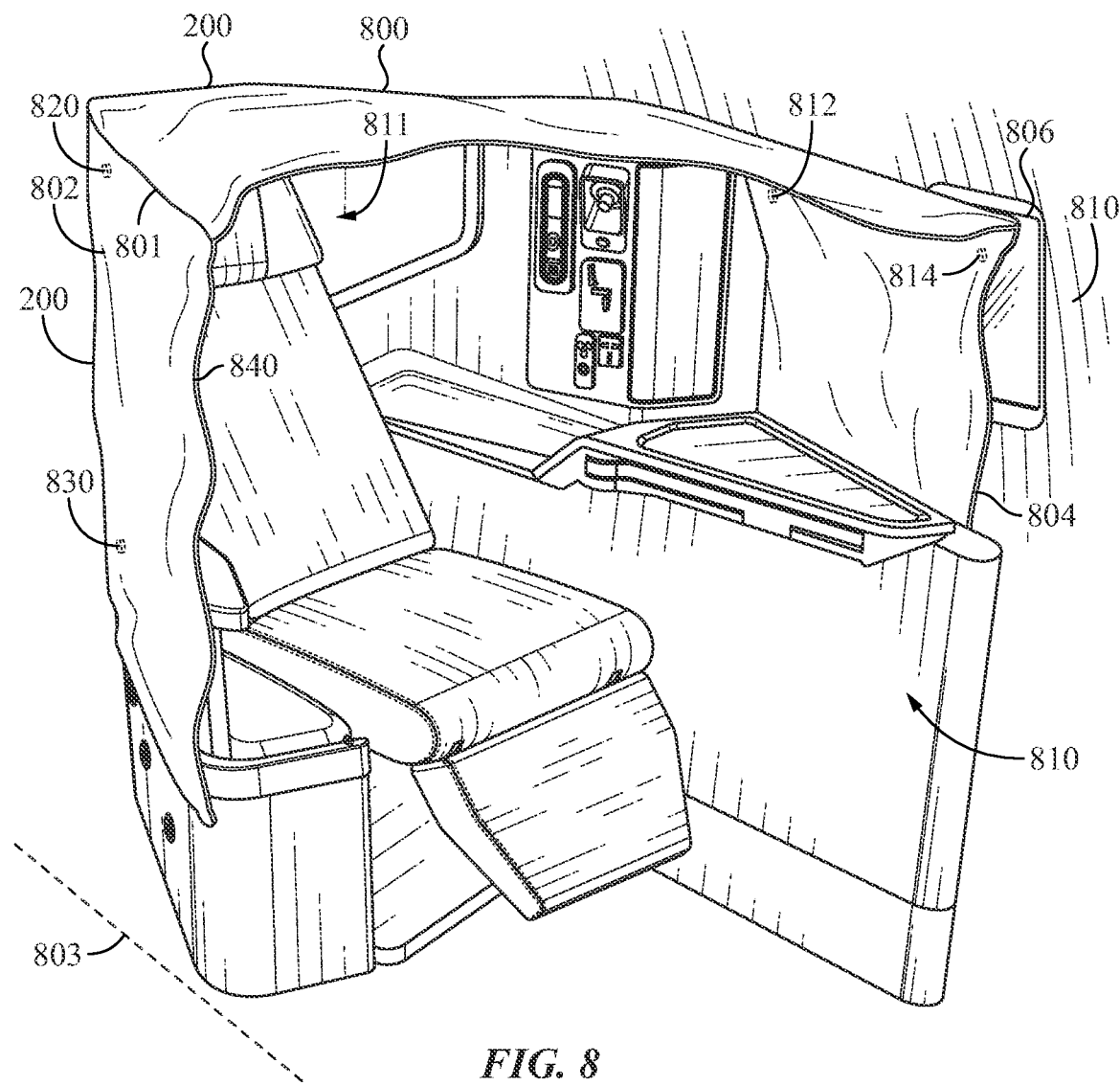
FIG. 8 illustrates a perspective view of the personal privacy and protective curtain within an aircraft cabin including a top cover, according to some embodiments.
Figure 9:
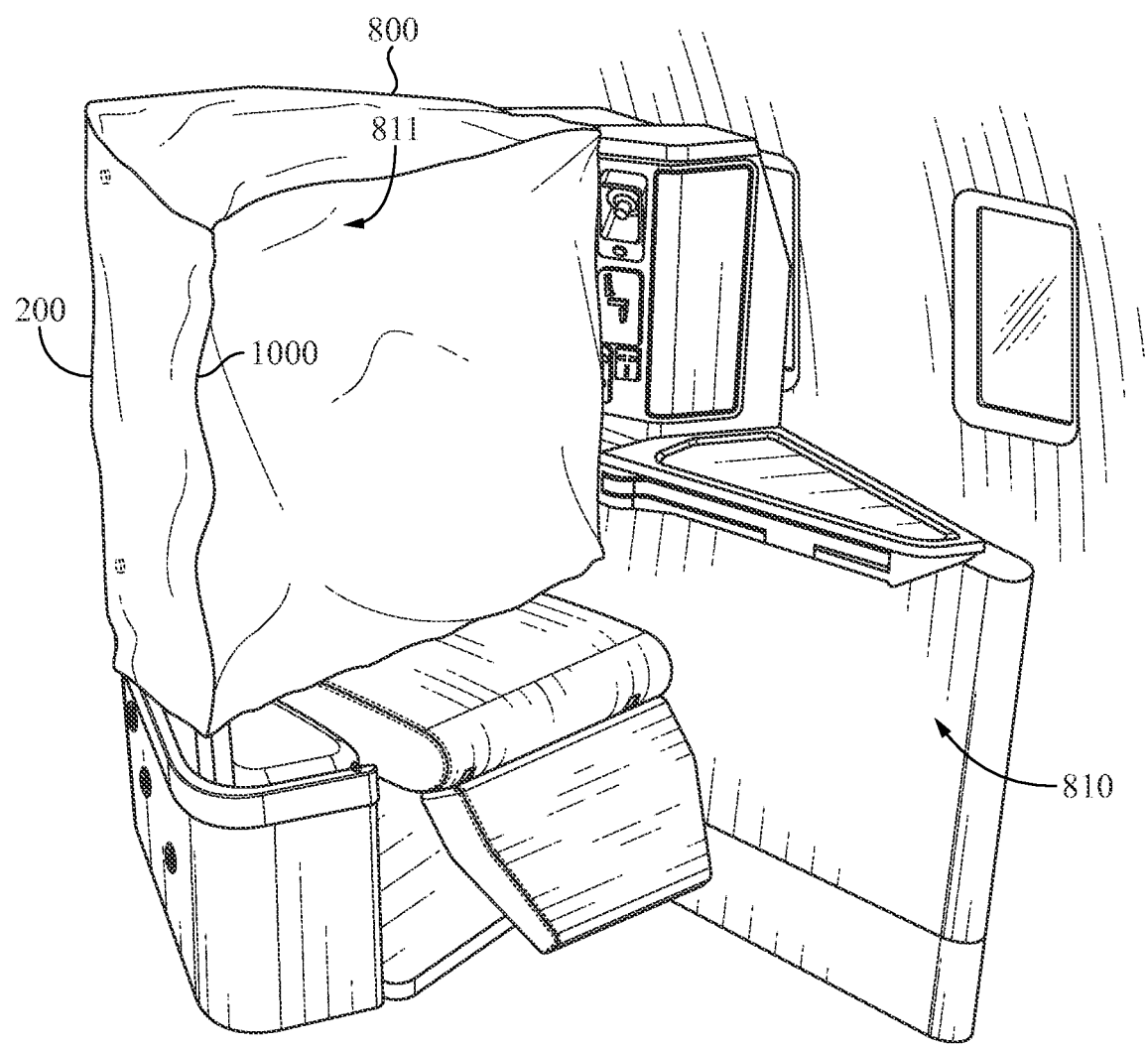
FIG. 9 illustrates a perspective view of the personal privacy and protective curtain within an aircraft cabin including a top cover, according to some embodiments.
Figure 10:
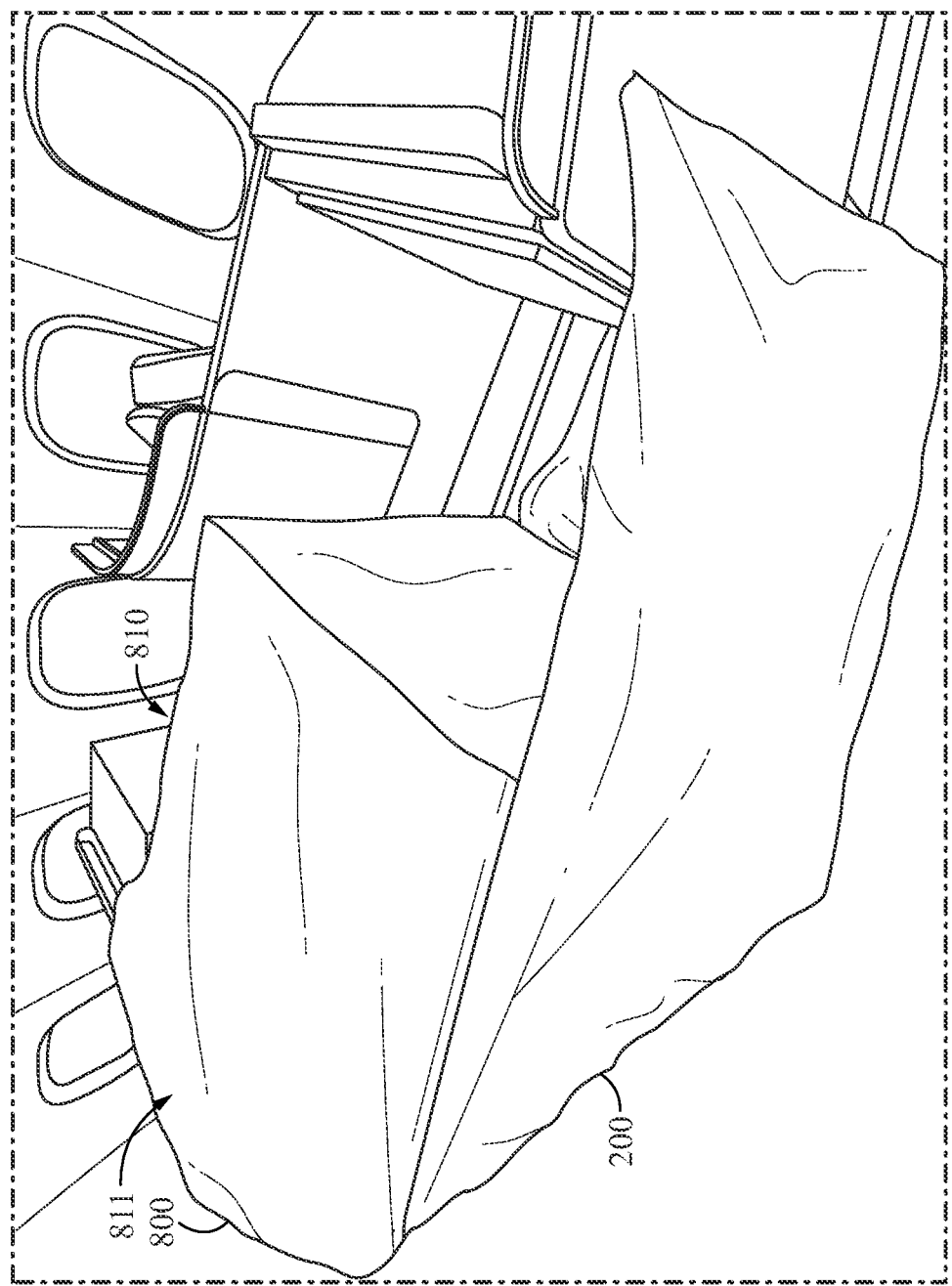
FIG. 10 illustrates a perspective view of the personal privacy and protective curtain within an aircraft cabin including a top cover, according to some embodiments.

FIGS. 8-10 illustrate the personal privacy and protective curtain 200 including a top cover 800. The top cover 800 connects to the side portion 802 by being integrally molded to one another, or via the attachment mechanisms described above. The side portion 802 connects and the aisle-side of the top cover 800, wherein the aisle-side is defined as the portion of the top cover 800 which is nearmost the aisle 803 of the aircraft cabin. This For example, the top cover 800 may be connected using a clip, magnet(s), or combination thereof such that the user can selectively attach and remove the top cover 800 as desired. This may be useful when the user wants partial privacy which can be defined as using the front cover 1000 (see FIG. 10) of the personal privacy and protective curtain, while having the top cover 800 disconnected. If the user wishes to increase the privacy they experience, they may then selectively engage the top cover 800 to the front cover 1000. The front cover 1000 may be raised or lowered over the head and torso of the passenger to selectively provide privacy.

In some embodiments, the top cover 800 at least partially block the view of the passenger from the overhead space 811 above the passenger's head. The overhead space is defined as the area between the overhead storage cabinets of the aircraft and the user's head.

In reference to FIG. 8, the top cover 800 may connected to a window cover portion 804 which covers the window 806. The window cover portion 804 extends from a side 808 of the top cover 800 which extends along the sidewall 810 of the aircraft cabin. The window cover portion 804 may be integrally connected to the side or may be removably engaged using the attachment mechanisms described herein above (e.g., magnets, clips, etc.).

The top cover 800 may releasably connect to the side portion 802 using connection components such as a top connection component 820 and a bottom connection component 830. The top and bottom connection components 820,830 may be magnets, suction cups, clips, etc.

In some embodiments, the top cover 800 includes one or more window portion magnets 812, and/or one or more window suction cups 814. The window portion magnets 812 may be useful to attaching to fixtures 202 within the aircraft, while the suction 814 may be able to connect to the window 806, or other non-magnetic surfaces (i.e., the sidewall 810 or fixtures 202). The window portion magnets 812 and suction cups 814 may be embedded within the top cover 800 or window cover portion 804. Alternatively, the window portion magnets 812 and suction cups 814 may be connected to the back side of the window cover portion 804.

In some embodiments, the personal privacy and protective curtain 200 including the top cover 800 may be dimensioned to cover an entire seating area 810, wherein the users head, torso, and legs are completely covered by the personal privacy and protective curtain 200.

In some embodiments, the personal privacy and protective curtain 200 including the top cover 800 may be dimensioned to cover only the users head and torso, while leaving their legs exposed (see FIG. 8 and FIG. 9). This may be especially useful if the flight crew requires that the seating area 900 be visible. The configuration shown in FIG. 9 still allows the users head and torso to be covered and retained within the interior of the personal privacy and protective curtain 200.

The personal privacy and protective curtain system may be configured in various configurations to completely block the seating space from view, or only covering the head and torso of the passenger. This may be especially useful if the passenger wants a portion of their body covered, while leaving the seating space open to the cabin. In some cases, leaving the seating space open to the cabin may be required by aircraft policy. In other cases, leaving a portion of the seating area exposed to view from the cabin allows for aircraft personnel to serve food and beverages, and otherwise service the area.

The embodiments illustrated in FIGS. 8-10 may be readily integrated with embodiments shown in FIGS. 1-7, allowing full customization of the user's privacy and protection based off their personal preferences, aircraft policy, and needs. For example, the passenger may utilize the curtain without the top cover while they are interacting with aircraft personnel and/or other passengers, or while eating. The top cover may then be attached to the curtain when the passenger wants total privacy, or when the passenger is relaxing or sleeping. Further, the configuration of the embodiments described herein may be modified to accommodate the specific cabin configurations of each airline. Therefore, it is to be understood that the system may be modular to allow a passenger to readily utilize the system in various airline seat configurations across multiple airlines.

It is to be understood that the personal privacy and protective curtain system can be integrated with the airline cabin and may not be portable.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A personal privacy and protective curtain system, comprising:
a curtain comprising a material to at least partially cover an opening provided in an aircraft cabin, the curtain is configured to at least partially block a passenger from view of other passengers within the aircraft cabin space during travel and provide a protective sanitary barrier, wherein the curtain extends from at least a first surface of a first fixture within the aircraft cabin to a second surface of a second fixture within the aircraft cabin, wherein the curtain is flexible and frame-free;
at least one attachment mechanism to releasably engage with the first surface of the first fixture within the aircraft cabin, the at least one attachment mechanism to interface with a corresponding attachment mechanism provided on the curtain;
the first fixture comprising a sidewall of a first seat used by the passenger;
the second fixture comprising the edge of a back side of a second seat in front of the first seat;
a top cover distinct from the curtain, the top cover configured to be attachable to a side portion of the curtain, to two side portions of the curtain, or to a front cover portion, and to extend above the passenger;

wherein the curtain is dimensioned to extend across the opening defined by the edge of the first fixture and the edge of the second fixture without relying on a frame, and is deployable without structural slip covers positioned over seatback; and wherein the curtain system when the top cover is attached, is further configured to fully enclose the first seat and allow crew visual access to at least a portion of the seat area for passenger safety and seatbelt verification.

2. The personal privacy and protective curtain system of claim 1, wherein the top cover is removably connected to the side portion using two or more connection components including at least a top connection component and a bottom connection component.

3. The personal privacy and protective curtain system of claim 1, wherein the top cover is removably connected to the curtain.

4. A personal privacy and protective system, comprising:
a curtain comprising a material to at least partially cover an opening provided in a vehicle cabin, the curtain being flexible and free of any supporting frame or wire structure, to at least partially block a passenger from view and provide a protective sanitary barrier;
at least one first attachment mechanism to releasably engage with a surface of at least one fixture within the vehicle cabin, the at least one first attachment mechanism to interface with a corresponding second attachment mechanism provided on the curtain, the system being deployable without reliance on any slipcover positioned over a fore or aft seatback;
a top cover releasably connected to a side portion, the top cover to extend above the passenger, wherein the top cover is attachable to one or more of: a first side curtain, a second side curtain, or a modular front cover, and is further configured to permit crew visibility of the seatbelt area, wherein the side portion extends from an aisle-side of the top cover;
side cover portion connected to the top cover, side cover portion to cover a window using the first attachment mechanism, wherein the first attachment mechanism comprises a first magnet at least partially embedded within a receiver and is configured to fully enclose the first seat and provide an adjustable fit across differently spaced cabin fixtures without obstructing emergency ingress or egress from the passenger seat.

5. The personal privacy and protective system of claim 4, wherein a second magnet is attached to a surface of the curtain, wherein the second magnet releasably engages with the first magnet.

6. The personal privacy and protective system of claim 5, wherein the second attachment mechanism comprises at least one suction cup to releasably engage with the first surface of the first fixture within the aircraft cabin.

7. The personal privacy and protective system of claim 6, wherein the suction cup comprises a second magnet.

8. The personal privacy and protective system of claim 7, wherein the second attachment mechanism comprises a clip releasably engaged with the surface, wherein the clip retains the curtain in a suitable position to at least partially block the passenger from view and provide a protective sanitary barrier.

9. The personal privacy and protective system of claim 8, wherein the clip comprises the first magnet at least partially embedded therein, wherein the magnet releasably engages with the second magnet.

10. The personal privacy and protective system of claim 9, wherein a plurality of magnets are provided within a cavity of the curtain.

11. The personal privacy and protective system of claim 10, wherein the plurality of magnets are sewn into the curtain to retain the plurality of magnets.

12. A personal privacy and protection system, comprising:
a portable curtain comprising a material to at least partially cover an opening provided in an aircraft cabin, the portable curtain being flexible and free of any supporting frame or wire structure, is configured to at least partially block a passenger from view and provide a protective sanitary barrier; wherein the portable curtain extends from at least a first surface to a second surface of two or more fixtures within the aircraft cabin;
at least one attachment mechanism to releasably engage with a surface of at least one fixture within the aircraft cabin, the at least one attachment mechanism to interface with a corresponding second attachment mechanism provided on the curtain, the at least one attachment mechanism comprising a flexible material to permit an adjustable fit between the two or more fixtures, and not requiring the use of a slipcover positioned over the seatback of any fore or aft seat;
a top cover distinct from the curtain, connected to the curtain, the top cover to at least partially obstruct the view of an overhead space of the passenger, the top cover being attachable to one or more of: a first side curtain, a second side curtain, or a modular front cover, and wherein the top cover is deployable without the portable curtain or side curtains.

13. The personal privacy and protective system of claim 12, wherein the attachment mechanism comprises a first magnet at least partially embedded within a receiver.

14. The personal privacy and protective system of claim 13, wherein a second magnet is attached to a surface of the portable curtain, wherein the second magnet releasably engages with the first magnet.

15. The personal privacy and protective curtain of claim 14, wherein the attachment mechanism comprises at least one suction cup to releasably engage with the surface.

16. The personal privacy and protective curtain of claim 15, wherein the suction cup comprises the first magnet at least partially embedded within the receiver.

17. The personal privacy and protective curtain of claim 16, wherein the second attachment mechanism comprises a clip releasably engaged with the surface, wherein the clip retains the portable curtain in a suitable position to at least partially block the passenger from view and provide a protective sanitary barrier.

18. The personal privacy and protective curtain of claim 17, wherein the clip comprises the first magnet at least partially embedded therein, wherein the first magnet releasably engages with the second magnet provided on the portable curtain.

19. The personal privacy and protective curtain of claim 18, wherein a plurality of magnets are provided within a cavity of the portable curtain.

20. The personal privacy and protective curtain of claim 19, wherein the plurality of magnets are sewn into the portable curtain to retain the plurality of magnets.

* * * * *